(12) United States Patent
Kling et al.

(10) Patent No.: US 11,973,776 B2
(45) Date of Patent: Apr. 30, 2024

(54) INTELLIGENT MONITORING AND LOGGING PLATFORM

(71) Applicant: BANK OF AMERICA CORPORATION, Charlotte, NC (US)

(72) Inventors: John Howard Kling, Cincinnati, OH (US); Charles Edward Dudley, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 17/238,774

(22) Filed: Apr. 23, 2021

(65) Prior Publication Data

US 2022/0345472 A1 Oct. 27, 2022

(51) Int. Cl.
*G06F 21/00* (2013.01)
*G06N 20/00* (2019.01)
*H04L 9/40* (2022.01)

(52) U.S. Cl.
CPC ......... *H04L 63/1425* (2013.01); *G06N 20/00* (2019.01)

(58) Field of Classification Search
CPC .. H04L 63/1425; H04L 63/1408; G06N 20/00
See application file for complete search history.

(56) References Cited

U.S. PATENT DOCUMENTS

| | | | | |
|---|---|---|---|---|
| 10,438,001 | B1* | 10/2019 | Hariprasad | G06F 21/577 |
| 2013/0007268 | A1* | 1/2013 | Breiter | G06F 11/3055 |
| | | | | 709/224 |
| 2013/0036359 | A1* | 2/2013 | Campagnoni | G06F 11/3093 |
| | | | | 715/736 |
| 2014/0351412 | A1* | 11/2014 | Elisha | G06F 11/3452 |
| | | | | 709/224 |
| 2018/0131592 | A1* | 5/2018 | Purushothaman | G06F 11/00 |
| 2018/0191766 | A1* | 7/2018 | Holeman | H04L 63/20 |
| 2019/0205545 | A1* | 7/2019 | Boutnaru | G06F 21/52 |
| 2021/0042140 | A1* | 2/2021 | Paul | G06F 1/3206 |
| 2021/0142186 | A1* | 5/2021 | Zhao | G06N 20/00 |
| 2021/0304063 | A1* | 9/2021 | Bulut | G06N 5/04 |
| 2022/0046037 | A1* | 2/2022 | Schwindt | H04L 63/123 |
| 2022/0121633 | A1* | 4/2022 | Quader | G06F 16/213 |

* cited by examiner

*Primary Examiner* — Michael M Lee
(74) *Attorney, Agent, or Firm* — Moore & Van Allen PLLC; James C. Edwards

(57) ABSTRACT

An enterprise-wise means for determining monitoring requirements for technology resources, such as, software, hardware, firmware, network or the like and implementing the monitoring. Artificial Intelligence (AI) is implemented to determine monitoring requirements based on characteristics of the technology resource that is to be monitored. In this regard, the characteristics of the technology resource serve to define the problem(s), such as cyber threats and/or performance issues that the technology resource currently faces or will face in the future. By determining the monitoring requirements based on the technology resource's characteristics, including the technological environment, the invention serves to describe what needs to be monitored in terms of the problems that the technology resource currently faces or will face.

17 Claims, 4 Drawing Sheets

INTELLIGENT MONITORING AND LOGGING PLATFORM

FIELD OF THE INVENTION

The present invention is generally directed to monitoring technology resources, such as software, hardware and the like for cyber threat and/or performance issues and, more specifically, intelligently determining monitoring requirements for a technology resource based on characteristics of the technology resource and which monitoring tools to deploy on the technology resources based on the monitoring requirements. In response, the monitoring tools are deployed, executed and results are logged.

BACKGROUND

Monitoring technology resources, such as software, hardware, firmware, and the like for cyber-security purposes poses many problems. For example, in many instances difficulties arise in defining the context or subject of the monitoring/logging and how to properly analyze the logged data that results from such monitoring. This problem is apparent because all too often the entity tasked with monitoring is unaware of what the cyber threat or problem is or will be in the future. As a result, monitoring may occur that is too detailed or too general or is otherwise unable to address the current or foreseen cyber threats. In the instances in which the monitoring is too detailed, a problem may exist in being able to properly filter the captured data to ensure that important data (i.e., cyber-threat or performance-related data) is scrutinized.

Moreover, as cyber threats evolve over time and new cyber threats emerge the ability to dynamically vary what is being monitored becomes important. Moreover, when pre-defined events or actions that are being monitored occurred, current monitoring platforms may not allow for varying what is being monitored or how monitoring occurs.

In addition, in many large enterprises, a multitude of different monitoring systems and/or platforms may be implemented. While in many instances these different monitoring systems are implemented in silo-like fashion, in other instances in which the multiple different systems/platforms are used in unison, problems arise in being able to piece together the various disparate monitoring systems/platforms to ensure that monitoring is not redundant or exhibits gaps.

Moreover, many current monitoring platforms/systems do not readily provide for a means of insuring that the monitoring is, in fact, monitoring for what its intended purpose.

Therefore, a need exists to develop systems, methods, computer program products and the like that address at least some of the aforementioned problems surrounding monitoring of technology resources for cyber security and/or performance data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an enterprise-wide system for determining monitoring requirements and implementing monitoring for technology resources (i.e., software, hardware, firmware, network, or the like). Specifically, embodiments of the invention implement Artificial Intelligence (AI) to determine monitoring requirements based on characteristics of the technology resource that is being monitored. The monitoring may include, but is not limited to, cyber threat monitoring, performance monitoring and the like. The characteristics not only include the (i) type of technology resource and the specifications of the technology resource, but also include (ii) the technological environment(s) in which the technology resource is deployed, and (iii) one or more purposes for the technology resource. In this regard, the characteristics of the technology resource serve to define the problems (i.e., cyber threats and/or performance issues) that the technology resource currently faces or will face in the future. By determining the monitoring requirements based on the technology resource's characteristics, including the technological environment, the invention serves to describe what needs to be monitored in terms of the characteristics including the technological environment.

In specific embodiments of the invention, AI is implemented to determine the monitoring requirements by applying monitoring rules that are selected based on the characteristics of the technology resource. Once the monitoring requirements have been determined, the present invention determines which set monitoring tools satisfy the monitoring requirements. The set of monitoring tools are subsequently deployed and executed on the technology resource. In response to execution of the monitoring tools, the monitoring results are logged, i.e., events/actions defined by the monitoring tools are logged. The integration/optimization of the monitoring tools ensures that redundant monitoring is limited and, in some instances, eliminated and identifies any gaps in the monitoring not addressed by the current set of monitoring tools.

In specific embodiments of the invention, the platform/system for determining monitoring requirements and implementing monitoring is a sub-system of an enterprise-wide resource management system. In specific embodiments of the invention, the resource management system includes a resource inventory management sub-system configured to track deployment of technology resources enterprise-wide. In other specific embodiments of the invention, the resource management system includes a monitoring results analytics sub-system configured to analytically analyze, at least, the logged specific events and actions monitored by the monitoring tools to (a) identify current problems related to the technology resource, and (b) predict future issues based on identified trends in the events and actions.

A system for determining monitoring requirements and implementing monitoring for enterprise-wise technology resources defines first embodiments of the invention. the system includes a plurality of monitoring tools. Each of the monitoring tools are configured to monitor for and log one or more specific events or actions performed by or associated with one or more technology resources.

The system additionally includes a computing platform including a memory and at least one processor in communication with the memory. The memory stores instructions that are executable by the at least one processor and configured to receive, for each of the enterprise technology resources, characteristics of the technology resource. The characteristics include at least (i) a type of technology resource, (ii) one or more technological environments in which the technology resource is deployed, and (iii) one or more purposes for the technology resource. The instructions are further configured to determine, for each of the enterprise technology resources, monitoring requirements based on the characteristics, and determine, for each of the enterprise technology resources, a set of monitoring tools from amongst the monitoring tools that satisfies the monitoring requirements. In addition, the instructions are further configured to deploy and execute, on each of the enterprise technology resources, the set of monitoring tools, and log the specific events or actions monitored by the set of monitoring tools.

In specific embodiments of the system, the plurality of monitoring tools include cyber threat monitoring tools and the instructions configured to determine monitoring requirements are further configured to determine cyber threat monitoring requirements. In other specific embodiments of the system, the plurality of monitoring tools further include performance monitoring tools and the instructions configured to determine monitoring requirements are further configured to determine performance monitoring requirements.

In further specific embodiments of the system, the instructions are further configured to determine the monitoring requirements by applying one or more monitoring rules selected based on the characteristics.

In additional specific embodiments of the system, the instructions configured to determine the set of monitoring tools are further configured to optimize the set of monitoring tools. Optimizing includes reducing or eliminating redundant monitoring on the technology resource. In other related specific embodiments of the system, the instructions are further configured to identify, for each of the technology resources, the monitoring requirements that cannot be satisfied by the plurality of monitoring tools (i.e., gaps that fail to satisfy the monitoring requirements).

In further specific embodiments of the system, the instructions are further configured to validate, for each of the technology resources, at least one selected from the group of (i) an accuracy of the monitoring requirements, and (ii) that the deployed monitoring tools satisfy the monitoring requirements.

Moreover, in additional embodiments the system for determining monitoring requirements and implementing monitoring for enterprise-wise technology resources is included in enterprise-wide technology resource management system. In such embodiments of the system, the enterprise-wide technology resource management system includes at least one of (i) an inventory management sub-system configured to track deployment of technology resources enterprise-wide and (ii) a monitoring results analytics sub-system configured to analytically analyze the logged specific events and actions monitored by the monitoring tools to (a) identify current problems related to the technology resource, and (b) predict future issues based on identified trends in the events and actions.

A computer-implemented method for determining monitoring requirements and implementing monitoring for enterprise-wise technology resources defines second embodiments of the invention. The method is executable by one or more computing processing devices. The method includes receiving, for each of a plurality of enterprise technology resources, characteristics, wherein the characteristics include at least (i) a type of technology resource, (ii) one or more technological environments in which the technology resource is deployed, and (iii) one or more purposes for the technology resource. The method further includes determining, for each of the enterprise technology resources, monitoring requirements based on the characteristics, and determining, for each of the enterprise technology resources, a set of monitoring tools from amongst a plurality of monitoring tools that satisfies the monitoring requirements. Additionally, the method includes deploying and executing, on each of the enterprise technology resources, the set of monitoring tools, and logging the specific events or actions monitored by the set of monitoring tools.

In specific embodiments of the computer-implemented method determining the set of monitoring tools from amongst the plurality of monitoring tools further defines the monitoring tools as one or more of (i) cyber threat monitoring tools and (ii) performance monitoring tools. In such embodiments of the computer-implemented method, determining monitoring requirements further includes determining one or more of (i) cyber threat monitoring requirements, an (ii) performance monitoring requirements.

In further embodiments the computer-implemented method includes determining the monitoring requirements by applying one or more monitoring rules selected based on the characteristics.

In other specific embodiments of the computer-implemented method determining the set of monitoring tools further comprises optimizing the set of monitoring tools. Optimizing includes reducing or eliminating redundant monitoring on the technology resource. In related embodiments the computer-implemented method further includes identifying, for each of the technology resources, the monitoring requirements that cannot be satisfied by the plurality of monitoring tools (i.e., gaps that fail to satisfy the monitoring requirements).

In still further specific embodiments, the computer-implemented method includes validating, for each of the technology resources, at least one selected from the group of (i) an accuracy of the monitoring requirements, and (ii) that the deployed monitoring tools satisfy the monitoring requirements.

A computer program product including a non-transitory computer-readable medium defines third embodiments of the invention. The computer-readable medium includes a first set of codes for causing a computer to receive, for each of a plurality of enterprise technology resources, characteristics of the technology resource. The characteristics include at least (i) a type of technology resource, (ii) one or more technological environments in which the technology resource is deployed, and (iii) one or more purposes for the technology resource. The computer-readable medium additionally includes a second set of codes for causing a computer to determine, for each of the enterprise technology resources, monitoring requirements based on the characteristics. Further, the computer-readable medium includes a third set of codes for causing a computer to determine, for each of the enterprise technology resources, a set of monitoring tools from amongst a plurality of monitoring tools that satisfies the monitoring requirements. In addition, the computer-readable medium includes a fourth set of codes for causing a computer to deploy and execute, on each of the enterprise technology resources, the integrated set of monitoring tools; and a fifth set of coded for causing a computer to log the specific events or actions monitored by the set of monitoring tools.

In other specific embodiments of the computer program product, the second set of codes are further configured to cause the computer to determine one or more of (i) cyber threat monitoring requirements, an (ii) performance monitoring requirements and the third set of codes are further configured to cause the computer to determine the set of monitoring tools from amongst the plurality of monitoring tools including one or more of (i) cyber threat monitoring tools, and (ii) performance monitoring tools.

In additional specific embodiments of the computer program product, the second set of codes are further configured to cause the computer to determine the monitoring requirements by applying one or more monitoring rules selected based on the characteristics.

Moreover, in additional specific embodiments of the computer program product, the third set of codes are further configured to cause the computer to optimize the set of monitoring tools. Optimizing includes reducing or eliminating redundant monitoring on the technology resource.

Thus, according to embodiments of the invention, which will be discussed in greater detail below, the present invention provides for an enterprise-wise means for determining monitoring requirements and implementing monitoring for technology resources, such as, software, hardware, firmware, network or the like. Specifically, embodiments of the invention implement Artificial Intelligence (AI) to determine monitoring requirements based on characteristics of the technology resource that is being monitored. In this regard, the characteristics of the technology resource serve to define the problems (i.e., cyber threats and/or performance issues) that the technology resource currently faces or will face in the future. By determining the monitoring requirements based on the technology resource's characteristics, including the technological environment, the invention serves to describe what needs to be monitored in terms of the characteristics including the technological environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
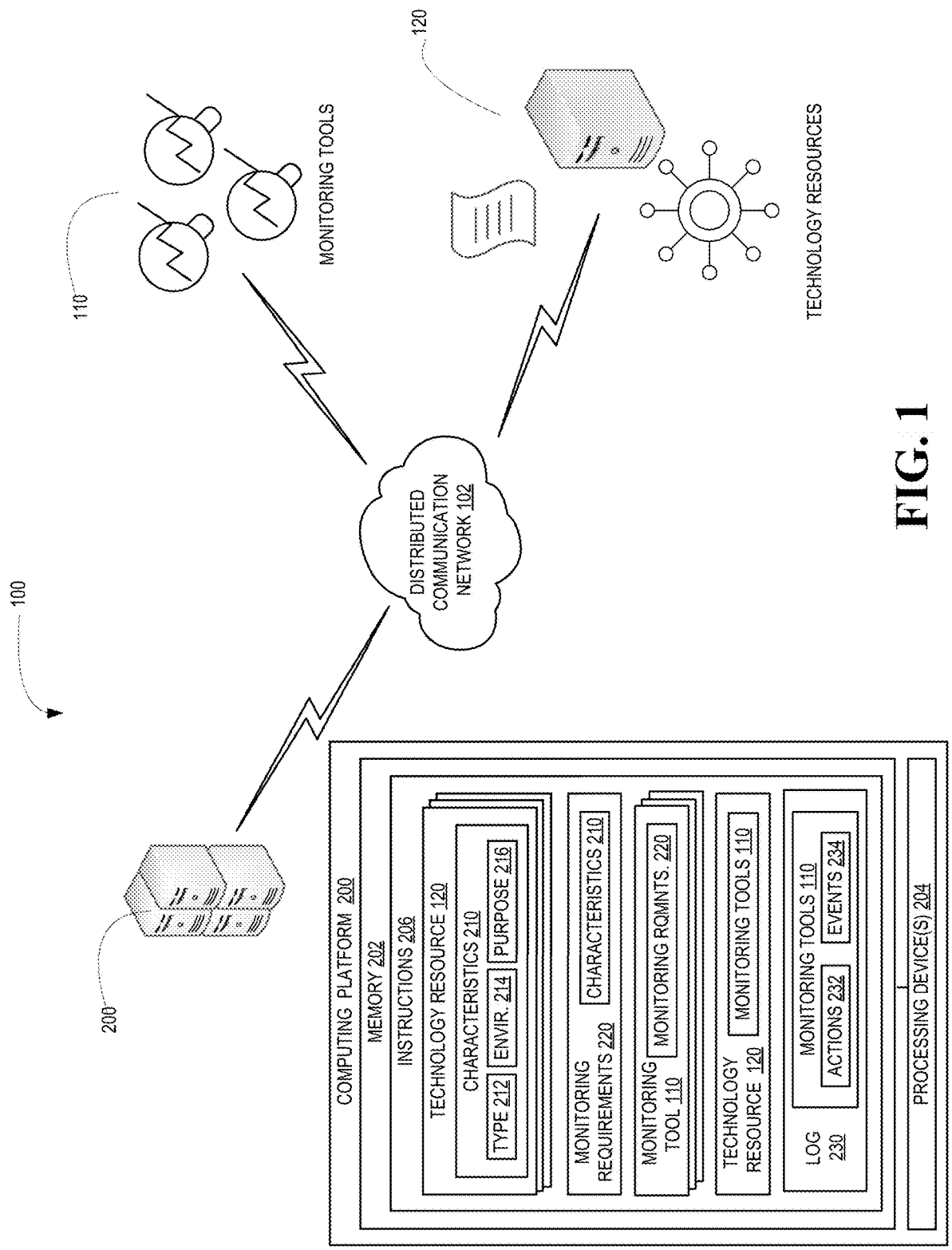
Figure 2:
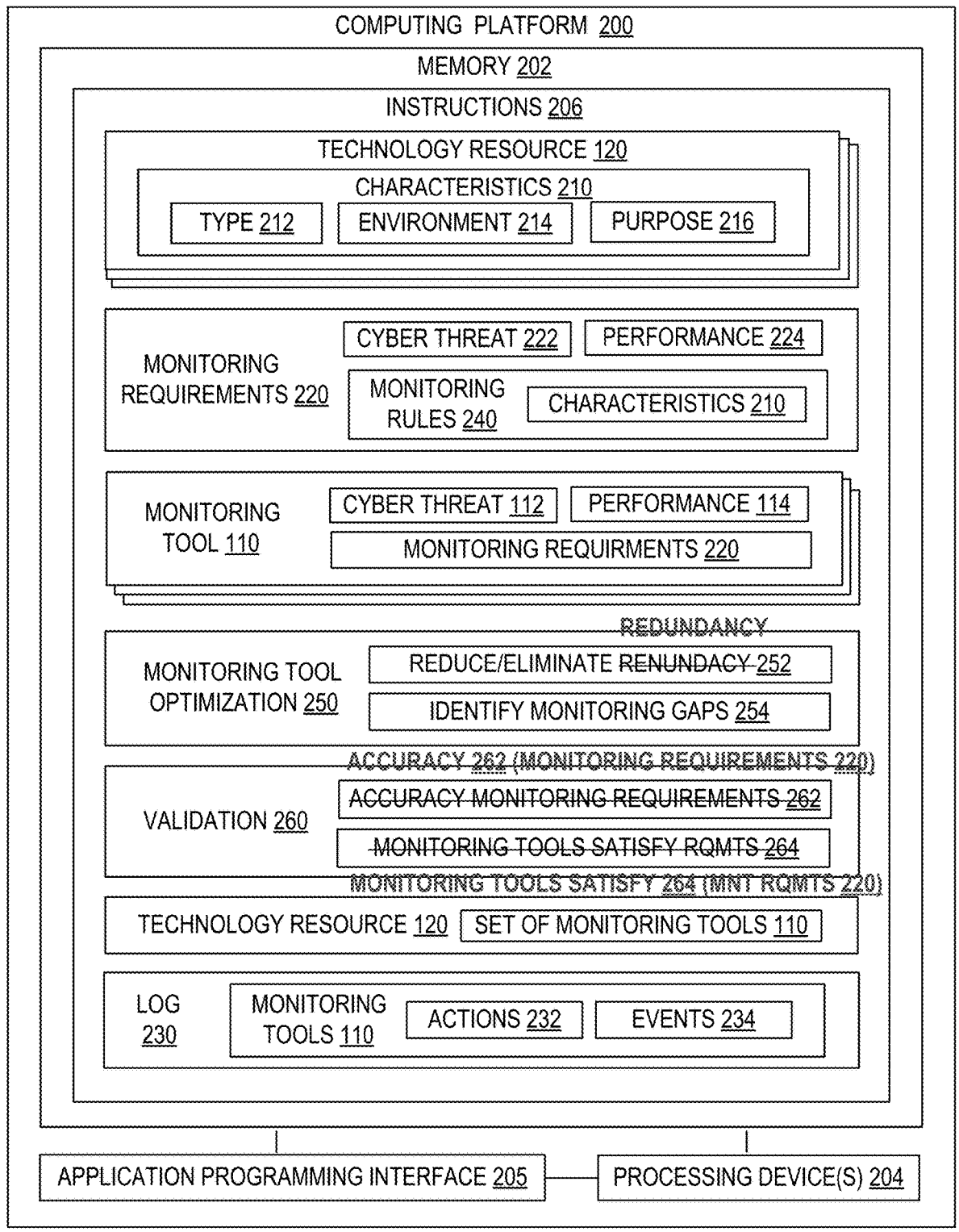
Figure 3:
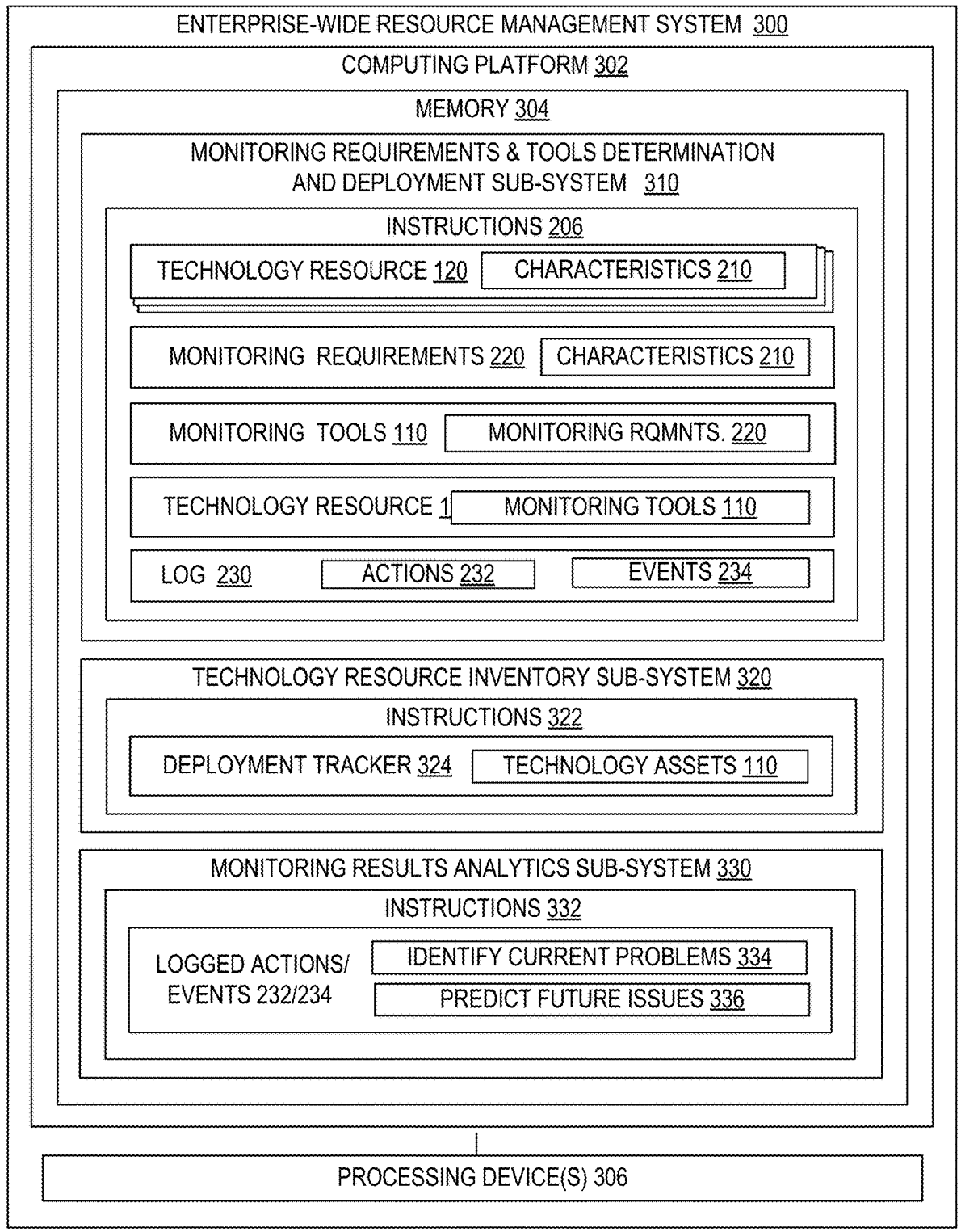
Figure 4:
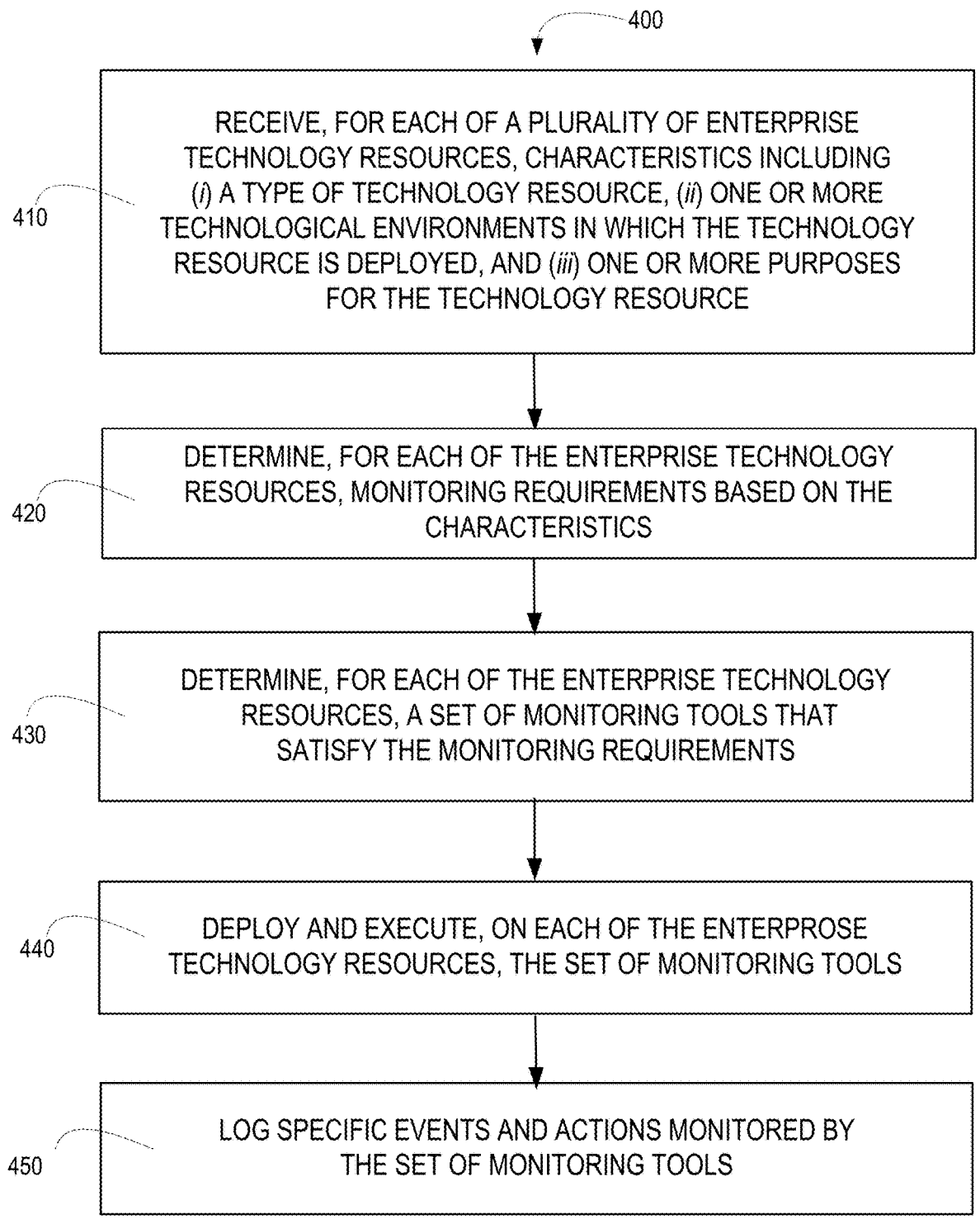

Having thus described embodiments of the disclosure in general terms, reference will now be made to the accompanying drawings, wherein:

FIG. 1 is a schematic/block diagram of a system for determining monitoring requirements for technology resources and implementing monitoring, in accordance with embodiments of the present invention;

FIG. 2 is a block diagram of a computing platform including instructions for an enterprise-wise system for determining monitoring requirements and implementing monitoring for technology resources; in accordance with embodiments of the present invention;

FIG. 3 is a block diagram depicting a system for enterprise-wide technology resource management including a sub-system for determining monitoring requirements and implementing monitoring for technology resources; in accordance with embodiments of the present invention; and FIG. 4 is a flow diagram of a method for determining monitoring requirements and implementing monitoring for technology resources, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below that provide for an enterprise-wide system or sub-system for determining monitoring requirements and implementing monitoring for technology resources (i.e., software, hardware, firmware, network, or the like). Specifically, embodiments of the invention implement Artificial Intelligence (AI) to determine monitoring requirements based on characteristics of the technology resource that is to be monitored. The monitoring may include, but is not limited to, cyber threat monitoring, performance monitoring and the like. The characteristics not only include (i) the type of technology resource and the specifications of the technology resource, but also include (ii) the technological environment(s) in which the technology resource is deployed, and (iii) one or more purposes for the technology resource. In this regard, the characteristics of the technology resource serve to define the problems (i.e., cyber threats and/or performance issues) that the technology resource currently faces or will face in the future. By determining the monitoring requirements based on the technology resource's characteristics, including the technological environment, the invention serves to describe what needs to be monitored in terms of the characteristics including the technological environment.

In specific embodiments of the invention, AI is implemented to determine the monitoring requirements by applying selected monitoring rules to the characteristics of the technology resource. Once the monitoring requirements have been determined, the present invention determines which set monitoring tools satisfy the monitoring requirements. The set of monitoring tools are subsequently deployed and executed on the technology resource. In response to execution of the monitoring tools, the results of the monitoring, i.e., events/actions defined by the monitoring tools are logged. The integration/optimization of the monitoring tools ensures that redundant monitoring is limited and, in some instances, eliminated and identifies any gaps in the monitoring not addressed by the current set of monitoring tools.

In other embodiments of the invention, the monitoring requirements are validated for accuracy/completeness and/or the monitoring tools are validated to ensure that they satisfy the monitoring requirements.

In specific embodiments of the invention, the platform/system for determining monitoring requirements and implementing monitoring is a sub-system of an enterprise-wide resource management system. In specific embodiments of the invention, the resource management system includes a resource inventory management sub-system configured to track deployment of technology resources enterprise-wide. In other specific embodiments of the invention, the resource management system includes a monitoring results analytics sub-system configured to analytically analyze, at least, the logged specific events and actions monitored by the monitoring tools to (a) identify current problems related to the technology resource, and (b) predict future issues based on identified trends in the events and actions.

Referring to FIG. 1, a system 100 for determining monitoring requirements and implementing monitoring at enterprise-wide technology resources, in accordance with embodiments of the present invention. The system 100 is implemented in a distributed communication network 102, which may comprise one or more of the Internet, intranet(s), cellular network(s), or the like. The system includes a plurality of monitoring tools 110. Each of the monitoring tools is configured to monitor one or more of the technology resources 120 for actions/events and log the occurrence of the monitored actions events. The technology resources 120 may include, but are not limited to, hardware, software, firmware, communication networks and the like.

The system 100 additionally includes a computing platform 200, such as application or server or the like, having a memory 202 and one or more processing devices 204 in communication with the memory 202.

Memory 202 stores instructions 206 that are executable by at least one of the processing device(s) 204 and are configured to determine monitoring requirements and implement monitoring across enterprise-wide technology resources 120. Specifically, instructions 206 are configured to receive, for each technology resource 120, characteristics 210 of the corresponding technology resource 120. The characteristics 210 include, but are not limited to, (i) the type 212 of technology resource, including one or more sub-types or classifications (e.g., a server being a type of technology resource 120 and a web server or database server being sub-types or classifications), (ii) one or more technology environments 214 in which the technology resource 120 is implemented/deployed, and (iii) one or more purposes 216 for the technology resource 120. Additionally, characteristics 210 include specifications of the technology resource, such as, but not limited to, computing speed, memory size and the like. By knowing, upfront, the type 212 of technology resource 120, as well as the environments 214 in which the technology resource 120 is used and the purposes 216 of the technology resource 120, the present invention is able to ascertain the monitoring needs of technology resource 120. In other words, the type 212 of technology resource, the environments 214 of use and purposes 216 of the technology resource 120 serve to describe/identify the problems/issues (e.g., cyber threats, performance or the like) that the technology resource 120 is currently facing or predict the problems/issues that the technology resource 120 will face in the future.

Instructions 206 are further configured to determine, for each technology resource 120, the monitoring requirements 220 based on the characteristics 210 of the technology resource. In specific embodiments of the invention, instructions 206 implement Artificial Intelligence (AI, including, in some embodiments, Machine Learning (ML) techniques and apply the characteristics 210 of the technology resource 120 to monitoring-related rules to determine the monitoring requirements 220. In such embodiments of the system, the monitoring-related rules may be based on or include, but are not limited to, government or other external entity regulatory rules, standards from standards bodies, internal/business compliance rules and the like In response to determining the monitoring requirements 220, instructions 206 are further configured to select, for each technology resource 120, a set of monitoring tools 110 from the plurality of monitoring of monitoring tools 110 that meet the monitoring requirements 220. The selection of the monitoring tools 110 occurs so as to optimize the monitoring that occurs at the corresponding technology resource 120. In this regard, the monitoring tools 110 in the selected set should minimize or eliminate monitoring redundancy (i.e., monitoring the same action/event more than once) and should minimize or eliminate gaps in monitoring (i.e., the monitoring tool 110 sets fails to address all of the monitoring requirements 220). In specific embodiments of the system, the instructions 202 are further configured to identify the gaps existing in the selected set of monitoring tools 110 and, using AI, including ML, determine other means for monitoring the actions/event or other means that will address the monitoring requirement 220.

In response to determining the set of monitoring tools 110, instructions 206 are configured to deploy and execute, on each of the technology resources 120, the set of monitoring tools 110 and log 230 specific actions 232 and/or events 234 monitored by the set of monitoring tools 110.

Referring to FIG. 2, a block diagram is depicted of a computing platform 200 configured for determining monitoring requirements and implementing monitoring on enterprise-wide technology resources, in accordance with various alternate embodiments of the invention. Computing platform 200, which, as previously discussed, may comprise one or more computing devices (e.g., application server(s), storage servers, or the like), is configured to execute software programs, including instructions, algorithms, modules, routines, applications, tools and the like. Computing platform 200 includes memory 202 which may comprise volatile and non-volatile memory, such as read-only and/or random-access memory (RAM and ROM), EPROM, EEPROM, flash cards, or any memory common to computing platforms. Moreover, memory 202 and the like may comprise cloud storage, such as provided by a cloud storage service and/or a cloud connection service.

Further, computing platform 200 also includes one or more processing device(s) 204, which may be application-specific integrated circuits ("ASIC"), or other chipset, logic circuit, or other data processing devices configured to execute the instructions 206. Processing device(s) 204 or the like may execute one or more application programming interface (APIs) 205 that interface with any resident programs, such as instructions 206 or the like stored in the memory 202 of the computing platform 200 and any external programs. Processing device(s) 204 may include various processing subsystems (not shown in FIG. 2) embodied in hardware, firmware, software, and combinations thereof, that enable the functionality of computing platform 200 and the operability of computing platform 200 on distributed communications network 102 (shown in FIG. 1). For example, processing subsystems allow for initiating and maintaining communications and exchanging data with other networked devices, such as email technology resources 120 or the like. For the disclosed aspects, processing subsystems of computing platform 200 may include any processing subsystem used in conjunction with instructions 206 and related engines, tools, routines, sub-routines, algorithms, sub-algorithms, sub-modules thereof.

Computing platform 200 additionally includes a communications module (not shown in FIG. 2) embodied in hardware, firmware, software, and combinations thereof, that enables electronic communications between computing platform 200 and other network devices. Thus, the communication module may include the requisite hardware, firmware, software and/or combinations thereof for establishing and maintaining a network communication connection with one or more network devices, such as technology resources 120 or the like.

As previously discussed in relation to FIG. 1, memory 202 stores instructions 206 that are executable by processing device(s) 204. Instructions 206 are configured to receive, for each technology resource 120, characteristics 210 of the corresponding technology resource 120. The characteristics 210 include, but are not limited to, (i) the type 212 of technology resource 120, including one or more sub-types or classifications, and specifications of the technology resource 120, (ii) one or more technology environments 214 in which the technology resource 120 is implemented/deployed, and (iii) one or more purposes 216 for the technology resource 120. The type 212 of technology resource 120, the environments 214 of use and purposes 216 of the technology resource 120 serve to describe/identify the problems/issues (e.g., cyber threats, performance or the like) that the technology resource 120 is currently facing or predict the problems/issues that the technology resource 120 will face in the future.

Instructions 206 are further configured to determine, for each technology resource 120, the monitoring requirements 220 based on the characteristics 210 of the technology resource. The monitoring requirements may include, but are not limited to, cyber threat/security 222 monitoring requirements and/or performance monitoring requirements 220. It should be noted that in specific embodiments of the invention the performance of the technology resource may have a direct effect on the security of the technology resource 120. In specific embodiments of the invention, instructions 206 implement Artificial Intelligence (AI, including, in some embodiments, Machine Learning (ML) techniques and apply the characteristics 210 of the technology resource 120 to monitoring-related rules 240 to determine the monitoring requirements 220. In such embodiments of the system, the monitoring-related rules may be based on or include, but are not limited to, government or other external entity regulatory rules, standards from standards bodies, internal/business compliance rules and the like In response to determining the monitoring requirements 220, instructions 206 are further configured to select, for each technology resource 120, a set of monitoring tools 110 from the plurality of monitoring of monitoring tools 110 that meet the monitoring requirements 220. The set of monitoring rules 110 may include, but are not limited to, cyber threat/security monitoring tools 112, performance monitoring tools 114 or the like. In specific embodiments of the invention, selection of the monitoring tools 110 includes monitoring optimization 250, which is configured to optimize the monitoring tools included in the selected set by reducing/eliminating monitoring redundancy 252 and identifying monitoring gaps 254. In further embodiments of the invention, instructions 206 may be configured to implement AI, including ML, to determine other means for monitoring the gap (i.e., other means that will address the monitoring requirement 220, which currently has a gap in the monitoring tools).

In further specific embodiments of the invention, instructions 206 are configured to perform validation 260 to validate at least one of (i) an accuracy 262 of the determined monitoring requirements 220 (i.e., validating that the monitoring requirements 220 satisfy the monitoring rules 240 and are aligned with the characteristics 210 of the technology resource 120, and (ii) that the monitoring tools 110 in the selected set satisfy 264 the monitoring requirements 220.

In response to determining the set of monitoring tools 110, instructions 206 are configured to deploy and execute, on each of the technology resources 120, the set of monitoring tools 110 and log 230 specific actions 232 and/or events 234 monitored by the set of monitoring tools 110.

Referring to FIG. 3, a block diagram is depicted of an enterprise-wide resource management system 300 configured to manage all facets of technology resources enterprise-wide. The system 300 includes a computing platform 302, such as application servers and the like, having a memory 304 and one or more processing devices 306 in communication with the memory. The memory stores monitoring requirements and tools determination and deployment sub-system 310. As discussed in relation to FIGS. 1 and 2, sub-system 310 includes instructions 310 that are executable by the processing device(s) 306 and configured to receive characteristics 210 of the technology resources 120 within an enterprise and determine monitoring requirements 220 based at least on the characteristics 210. The instructions are further configured to select a set of monitoring tools 110 for each of the technology resources 120 based on the monitoring requirements 210. Further, instructions 206 are configured to deploy and execute, on each of the technology resources 120, the monitoring tools 110 and log 230 specific actions 232 and/or events 234 associated with the monitoring tools 110.

Additionally, resource management system 300 includes technology resource inventory sub-system 320 that includes instructions 322 that are executable by the processing device(s) and include deployment tracker instructions 324 that is configured to track deployment of technology resources, including, but not limited to, versions of software deployed, environment/location of technology resources and the like. Further, resource management system 300 includes monitoring results analytics sub-system 330 that includes instructions 332 that are executable by the processing device(s) and configured to analytically analyze logged actions/events 232, 234 (i.e., monitoring results) to identify current cyber threat/security and/or performance problems/issues 334 and, implementing AI, including ML, predict future cyber threat/security and/or performance problems/issues 336.

Referring to FIG. 4 a flow diagram is depicted of a method 400 for determining monitoring requirements for enterprise-wide technology resources and implementing monitoring that satisfies the requirements, in accordance with embodiments of the present invention. At Event 410, characteristics are received for each of a plurality of technology resources. The characteristics include, but are not limited to, (i) the type of technology resource, including one or more sub-types or classifications and specifications for the technology resource (e.g., hardware, processing speed, memory capacity and the like), (ii) one or more technology environments in which the technology resource is implemented/deployed, and (iii) one or more purposes for the technology resource. By knowing, upfront, the type of technology resource, as well as the environments in which the technology resource is used and the purposes of the technology resource, the present invention is able to describe the problems/issues that the technology resource faces or will face and ascertain the monitoring needs of technology resource.

At Event 420, the monitoring requirements are determined for each technology resource based on the characteristics of the technology resource. In specific embodiments of the method, Artificial Intelligence (AI, including, in some embodiments, Machine Learning (ML) techniques are implemented and the characteristics of the technology resource are applied to monitoring-related rules to determine the monitoring requirements. In such embodiments of the system, the monitoring-related rules may be based on or include, but are not limited to, government or other external entity regulatory rules, standards from standards bodies, internal/business compliance rules and the like. In further specific embodiments of the invention, the determined monitoring requirements are validated to ensure that the requirements meet the applicable rules and are aligned with the characteristics of the technology resource.

In response to determining the monitoring requirements, at Event 430, a set of monitoring tools is selected from amongst a plurality of monitoring of monitoring tools that meet the monitoring requirements. The selection of the monitoring tools includes optimizing the selected set of monitoring tools to ensure that no more and no less monitoring occurs. In this regard, optimization ensures that the monitoring tools in the selected set minimize or eliminate monitoring redundancy and should minimize or eliminate gaps in monitoring. In specific embodiments of the method, gaps are identified in the selected set of monitoring tools and, using AI, including ML, other means for monitoring the actions/event are determined.

In response to determining the set of monitoring tools, at Event 440, the monitoring tools are deployed and executed on each on the corresponding technology resources, and, at Event 450, specific actions and/or events monitored by the set of monitoring tools are logged.

Thus, present embodiments of the invention provide systems, methods, computer program products and/or the like for determining monitoring requirements for enterprise-wide technology resources, such as, software, hardware, firmware, network or the like and subsequently implementing the monitoring. Specifically, embodiments of the invention implement Artificial Intelligence (AI) to determine monitoring requirements based on characteristics of the technology resource that is being monitored. In specific embodiments the monitoring requirements are determined by applying AI to monitoring rules that are selected based on the characteristics of the technology resource. In this regard, the characteristics of the technology resource serve to define the problems, such as, cyber threats and/or performance issues, that the technology resource currently faces or will face in the future.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining monitoring requirements and implementing monitoring for enterprise-wide technology resources, the system comprising:
   a plurality of monitoring tools including cyber-threat monitoring tools and performance monitoring tools, each of the monitoring tools configured to monitor and log for one or more specific events or actions performed by or associated with one or more of the enterprise-wide technology resources; and
   a computing platform including a memory and at least one processor in communication with the memory, wherein the memory stores instructions that are executable by the at least one processor and configured to:
      receive, for each of the enterprise-wide technology resources, characteristics, wherein the characteristics include at least (i) a type of technology resource, (ii) one or more technological environments in which the technology resource is deployed, and (iii) one or more purposes for the technology resource,
      implement first Artificial Intelligence (AI) including first Machine Learning (ML) techniques to determine, for each of the enterprise-wide technology resources, monitoring requirements based on the characteristics,
      determine, for each of the enterprise-wide technology resources, a set of monitoring tools from amongst the monitoring tools that satisfies at least a portion of the monitoring requirement, wherein determining the set of monitoring tools includes optimizing monitoring occurring at each of the enterprise-wide technology resources by minimizing (i) monitoring redundancy and (ii) the monitoring requirements not satisfied,
      identify, for at least one of the enterprise-wide technology resources, at least one monitoring requirement from amongst the monitoring requirements that are not satisfied by the set of monitoring tools and implement second AI including second ML techniques to determine actions to satisfy the at least one monitoring requirement,
      deploy and execute, on each of the enterprise-wide technology resources, the set of monitoring tools, and
      log specific events or actions monitored by the set of monitoring tools.

2. The system of claim 1, wherein the plurality of monitoring tools comprises cyber threat monitoring tools and wherein the instructions configured to determine the monitoring requirements are further configured to determine cyber threat monitoring requirements.

3. The system of claim 2, wherein the plurality of monitoring tools further comprises performance monitoring tools and wherein the instructions configured to determine the monitoring requirements are further configured to determine performance monitoring requirements.

4. The system of claim 1, wherein the instructions configured to determine the monitoring requirements are further configured to determine the monitoring requirements by applying monitoring rules selected based on the characteristics.

5. The system of claim 1, wherein the instructions are further configured to identify, for each of the enterprise-wide technology resources, the monitoring requirements that cannot be satisfied by the plurality of monitoring tools.

6. The system of claim 1, wherein the instructions are further configured to validate, for each of the enterprise-wide technology resources, at least one selected from a group comprising of (i) an accuracy of the monitoring requirements, and (ii) that the deployed monitoring tools satisfy the monitoring requirements.

7. The system of claim 1, wherein the system for determining monitoring requirements and implementing monitoring for the enterprise-wide technology resources is included in an enterprise-wide technology resource management system.

8. The system of claim 7, wherein the enterprise-wide technology resource management system includes an inventory management sub-system configured to track deployment of the enterprise-wide technology resources across an enterprise.

9. The system of claim 7, wherein the enterprise-wide technology resource management system includes a monitoring results analytics sub-system configured to analytically analyze the logged specific events and actions monitored by the monitoring tools to (i) identify current problems related to a corresponding technology resource from amongst the enterprise-wide technology resources, and (ii) predict future issues based on identified trends in the logged specific events and actions.

10. A computer-implemented method for determining monitoring requirements and implementing monitoring for enterprise-wide technology resources, the method is executable by one or more computing processing devices and comprises:
   receiving, for each of a plurality of enterprise-wide technology resources, characteristics, wherein the characteristics include at least (i) a type of technology resource, (ii) one or more technological environments in which the technology resource is deployed, and (iii) one or more purposes for the technology resource;
   implementing first Artificial Intelligence (AI) including first Machine Learning (ML) techniques to determine, for each of the plurality of enterprise-wide technology resources, monitoring requirements based on the characteristics;
   determining, for each of the plurality of enterprise-wide technology resources, a set of monitoring tools from amongst a plurality of monitoring tools including cyber-threat monitoring tools and performance monitoring tools, wherein the set of monitoring tools satisfies at least a portion of the monitoring requirements, wherein determining the set of monitoring tools includes optimizing monitoring occurring at each of the enterprise-wide technology resources by minimizing (i) monitoring redundancy and (ii) the monitoring requirements not satisfied;
   identifying, for at least one of the plurality of enterprise-wide technology resources, at least one monitoring requirement from amongst the monitoring requirements that are not satisfied by the set of monitoring tools and implement second AI including second ML techniques to determine actions to satisfy the at least one monitoring requirement;
   deploying and executing, on each of the plurality of enterprise-wide technology resources, the set of monitoring tools; and
   logging specific events or actions monitored by the set of monitoring tools.

11. The computer-implemented method of claim 10, wherein the determining the set of monitoring tools from amongst the plurality of monitoring tools further defines the monitoring tools as one or more of (i) cyber threat monitoring tools and (ii) performance monitoring tools and wherein the determining monitoring requirements further comprises determining one or more of (i) cyber threat monitoring requirements, an (ii) performance monitoring requirements.

12. The computer-implemented method of claim 10, wherein the determining the monitoring requirements further comprises determining the monitoring requirements by applying monitoring rules selected based on the characteristics.

13. The computer-implemented method of claim 10, further comprising:
   identifying, for each of the enterprise-wide technology resources, the monitoring requirements that cannot be satisfied by the plurality of monitoring tools.

14. The computer-implemented method of claim 10, further comprising:
   validating, for each of the enterprise-wide technology resources, at least one selected from a group comprising of (i) an accuracy of the monitoring requirements, and (ii) that the deployed monitoring tools satisfy the monitoring requirements.

15. A computer program product comprising:
   a non-transitory computer-readable medium comprising:
      a first set of codes for causing at least one computer to receive, for each of a plurality of enterprise-wide technology resources, characteristics, wherein the characteristics include at least (i) a type of technology resource, (ii) one or more technological environments in which the technology resource is deployed, and (iii) one or more purposes for the technology resource;
      a second set of codes for causing the at least one computer to implement first Artificial Intelligence (AI) including first Machine Learning (ML) techniques to determine, for each of the enterprise-wide technology resources, monitoring requirements based on the characteristics;
      a third set of codes for causing the at least one computer to determine, for each of the enterprise-wide technology resources, a set of monitoring tools from amongst a plurality of monitoring tools including cyber-threat monitoring tools and performance monitoring tools, wherein the set of monitoring tools satisfies at least a portion of the monitoring requirements, wherein determining the set of monitoring tools includes optimizing monitoring occurring at each of the enterprise-wide technology resources by minimizing (i) monitoring redundancy and (ii) the monitoring requirements not satisfied;
      a fourth set of codes for causing the at least one computer to identify, for at least one of the plurality of enterprise-wide technology resources, at least one monitoring requirement from amongst the monitoring requirements that are not satisfied by the set of monitoring tools and implement second AI including second ML techniques to determine actions to satisfy the at least one monitoring requirement;
      a fifth set of codes for causing the at least one computer to deploy and execute, on each of the enterprise-wide technology resources, the set of monitoring tools; and
      a sixth set of coded for causing the at least one computer to log specific events or actions monitored by the set of monitoring tools.

16. The computer program product of claim 15, wherein the second set of codes are further configured to cause the at least one computer to determine the monitoring requirements, wherein the monitoring requirements comprise one or more of (i) cyber threat monitoring requirements, an (ii) performance monitoring requirements, and
   wherein the third set of codes are further configured to cause the at least one computer to determine the set of monitoring tools from amongst the plurality of monitoring tools, wherein the monitoring tools comprise one or more of (i) cyber threat monitoring tools, and (ii) performance monitoring tools.

17. The computer program product of claim 15, wherein the second set of codes are further configured to cause the at least one computer to determine the monitoring requirements by applying monitoring rules selected based on the characteristics.

* * * * *